US012576778B2

(12) United States Patent
Mouri

(10) Patent No.: US 12,576,778 B2
(45) Date of Patent: **\*Mar. 17, 2026**

(54) INDICATOR APPARATUS FOR VEHICLE

(71) Applicant: TOYOTA JIDOSHA KABUSHIKI KAISHA, Aichi-ken (JP)

(72) Inventor: Fumihiko Mouri, Owariasahi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 37 days.

This patent is subject to a terminal disclaimer.

(21) Appl. No.: 18/900,899

(22) Filed: Sep. 30, 2024

(65) Prior Publication Data

US 2025/0018858 A1     Jan. 16, 2025

Related U.S. Application Data

(63) Continuation of application No. 18/165,333, filed on Feb. 7, 2023, now Pat. No. 12,128,818.

(30) Foreign Application Priority Data

Feb. 9, 2022     (JP) ................................. 2022-018546

(51) Int. Cl.
*B60Q 1/34*          (2006.01)

(52) U.S. Cl.
CPC ............ *B60Q 1/34* (2013.01); *B60Q 2400/50* (2013.01)

(58) Field of Classification Search
CPC ........ B60Q 1/34; B60Q 2400/50; B60Q 1/38; B60Q 1/46; B60Q 1/346; B60Q 1/26; B60Q 1/50
See application file for complete search history.

(56) References Cited

U.S. PATENT DOCUMENTS

| | | | |
|---|---|---|---|
| 2018/0093607 A1 | 4/2018 | Omanovic |
| 2023/0271548 A1 | 8/2023 | Shibata |

FOREIGN PATENT DOCUMENTS

| | | |
|---|---|---|
| JP | 2003-159986 A | 6/2003 |
| WO | 2021006217 A1 | 1/2021 |
| WO | 2022/030181 A1 | 2/2022 |

*Primary Examiner* — Brian A Zimmerman
*Assistant Examiner* — Cal J Eustaquio
(74) *Attorney, Agent, or Firm* — HAUPTMAN HAM, LLP

(57) ABSTRACT

An indicator apparatus for a vehicle is provided which draws an indication of a predetermined shape on a road surface on a side of a course of travel by illuminating light onto the road surface when a user performs a travel course changing operation which is an operation for changing a course of travel of a vehicle, in which a drawing operation on the road surface is prohibited when a hazard switch is set in an ON state.

1 Claim, 9 Drawing Sheets

FIG. 3

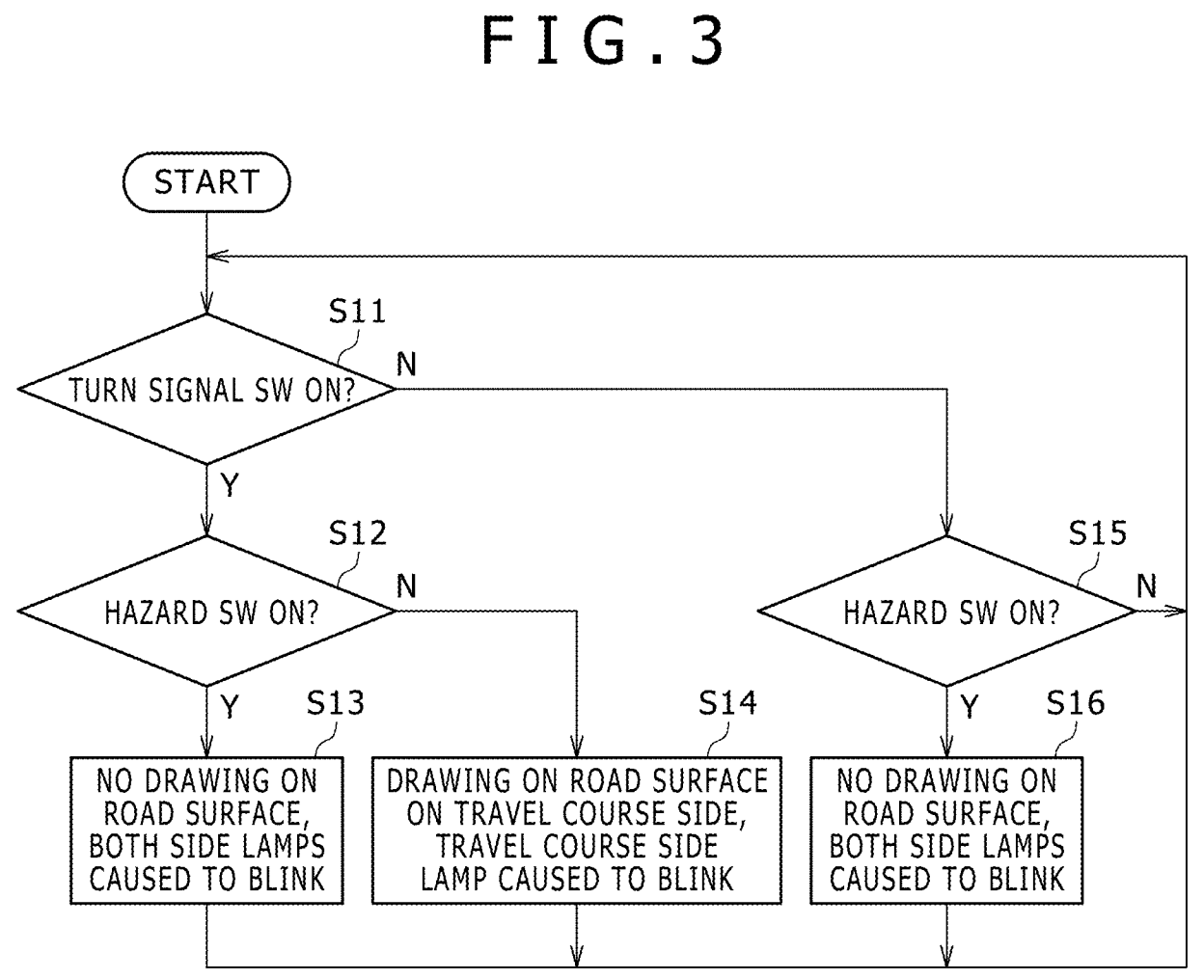

START

S11 — TURN SIGNAL SW ON?

S12 — HAZARD SW ON?

S13 — NO DRAWING ON ROAD SURFACE, BOTH SIDE LAMPS CAUSED TO BLINK

S14 — DRAWING ON ROAD SURFACE ON TRAVEL COURSE SIDE, TRAVEL COURSE SIDE LAMP CAUSED TO BLINK

S15 — HAZARD SW ON?

S16 — NO DRAWING ON ROAD SURFACE, BOTH SIDE LAMPS CAUSED TO BLINK

F I G . 4
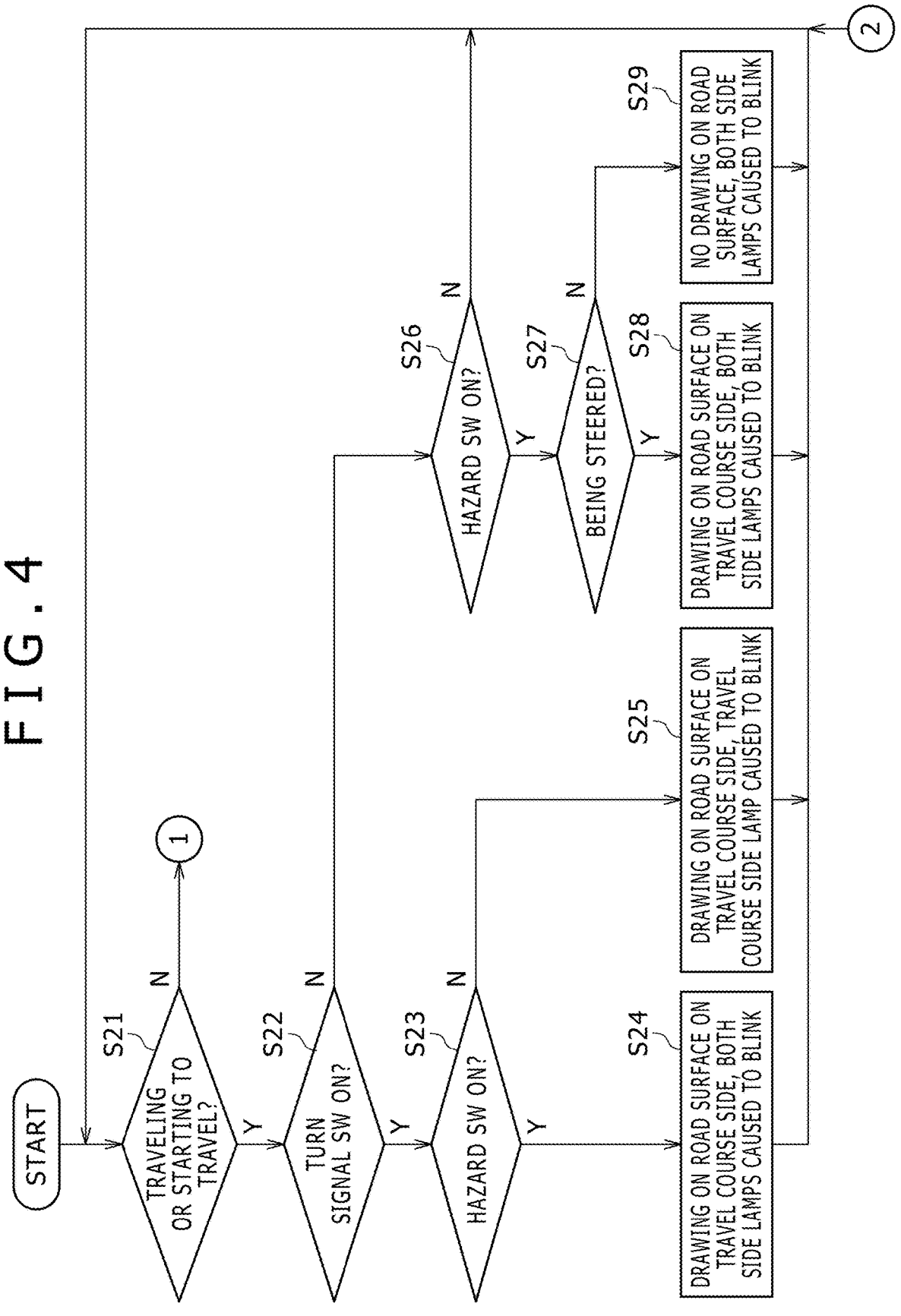

FIG. 5

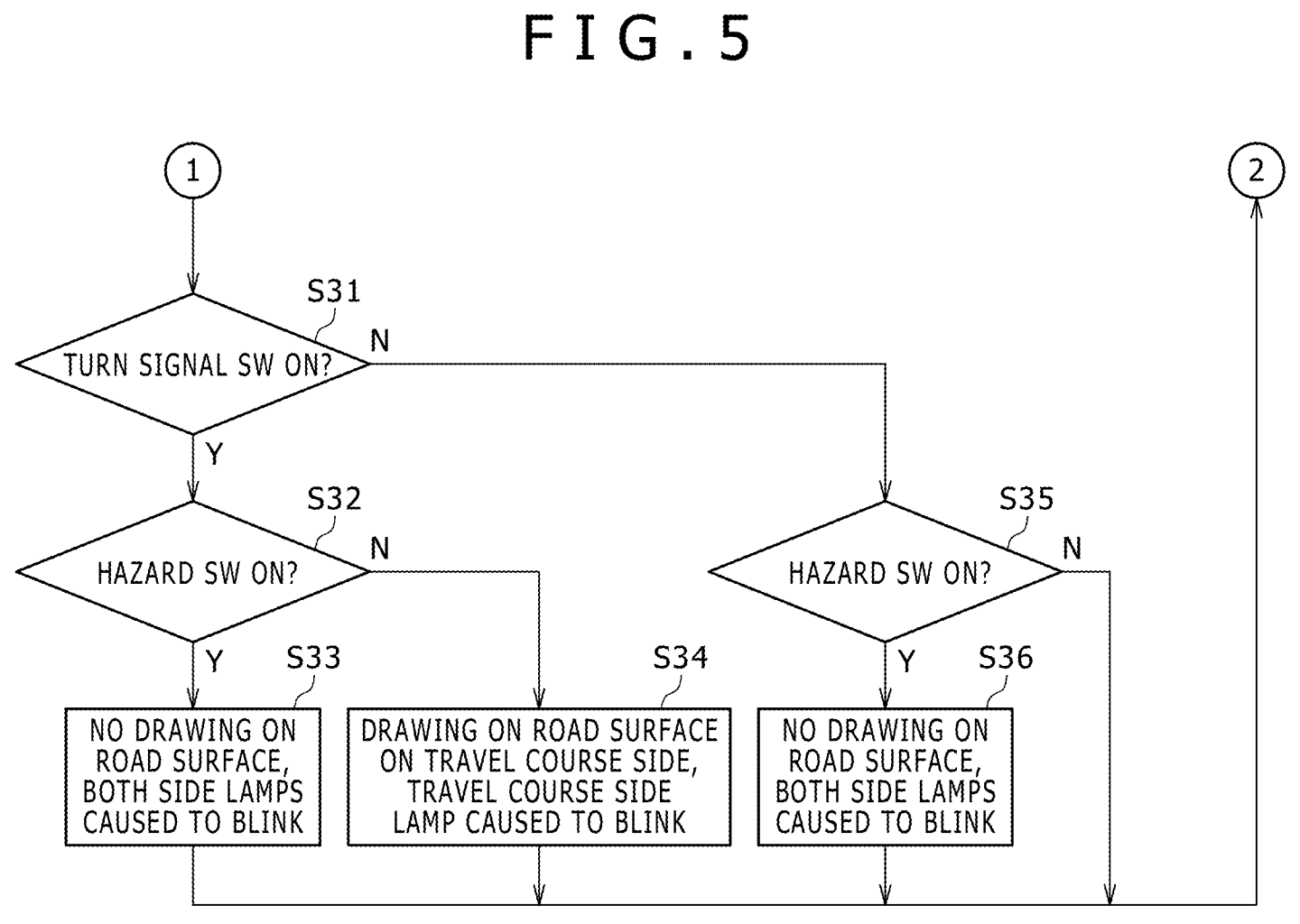

```
                    ┌──────────────── ②
                    │
  ①                 │
  │                 │
  ▼                 │
 ╱S31╲              │
╱TURN  ╲ N          │
╲SIGNAL╱───────────┐│
 ╲SW ON?╱          ││
  ╲  ╱             ││
   │Y              ││
   ▼               ││
  ╱S32╲            ╱S35╲
 ╱HAZARD╲ N       ╱HAZARD╲ N
 ╲SW ON?╱──────┐ ╲SW ON?╱────────┐
  ╲   ╱        │  ╲   ╱           │
   │Y          │   │Y            │
   ▼           │   ▼             │
┌────────┐     │ ┌────────┐      │
│  S33   │     │ │  S36   │      │
│NO      │     │ │NO      │      │
│DRAWING │     │ │DRAWING │      │
│ON ROAD │     │ │ON ROAD │      │
│SURFACE,│     │ │SURFACE,│      │
│BOTH    │     │ │BOTH    │      │
│SIDE    │     │ │SIDE    │      │
│LAMPS   │     │ │LAMPS   │      │
│CAUSED  │     │ │CAUSED  │      │
│TO BLINK│     │ │TO BLINK│      │
└────────┘     │ └────────┘      │
               │                 │
          ┌────────┐             │
          │  S34   │             │
          │DRAWING │             │
          │ON ROAD │             │
          │SURFACE │             │
          │ON      │             │
          │TRAVEL  │             │
          │COURSE  │             │
          │SIDE,   │             │
          │TRAVEL  │             │
          │COURSE  │             │
          │SIDE    │             │
          │LAMP    │             │
          │CAUSED  │             │
          │TO BLINK│             │
          └────────┘             │
```

INDICATOR APPARATUS FOR VEHICLE

CROSS REFERENCE TO RELATED APPLICATION

The present application is a continuation of U.S. patent application Ser. No. 18/165,333, filed Feb. 7, 2023, which claims priority to Japanese Patent Application No. 2022-018546, filed Feb. 9, 2022, the contents of each of which are incorporated herein by reference in their entirety.

TECHNICAL FIELD

The present disclosure relates to an indicator apparatus for a vehicle, which draws an indication of a predetermined shape on a road surface on a side of a course of travel by illuminating light onto the road surface when a user performs a travel course changing operation which is an operation for changing the course of travel of a vehicle.

BACKGROUND

An indicator apparatus for a vehicle can draw an indication of a predetermined shape by illuminating light onto a road surface. For example, WO 2021/006217 discloses an indicator apparatus for a vehicle in which, when a turn signal switch (direction indicator) is set in an ON state, a lamp on the side of the course of travel of the vehicle is caused to blink, and an indication of a predetermined shape is drawn on the road surface by illuminating light onto the road surface in a linked manner with the lamp.

In some cases, an electronic circuit of the lamp is connected to a hazard switch. In these cases, the indication of the predetermined shape may be drawn on the road surface by illuminating light onto the road surface in a linked manner with blinking of the lamps on both sides of the vehicle in response to switching the hazard switch to the ON state during a period in which the vehicle is stopped. In these cases, there is a possibility that pedestrians or the like in the surroundings may misunderstand that the vehicle will start traveling, resulting in possible confusion of the pedestrians or the like.

An advantage of the present disclosure lies in the provision of an indicator apparatus for a vehicle which does not cause confusion of pedestrians or the like in the surroundings.

SUMMARY

According to one aspect of the present disclosure, there is provided an indicator apparatus for a vehicle, wherein the indicator apparatus draws an indication of a predetermined shape on a road surface on a side of a course of travel by illuminating light onto the road surface when a user performs a travel course changing operation which is an operation for changing the course of travel of the vehicle, and a drawing operation on the road surface is prohibited when a hazard switch is set in an ON state.

According to another aspect of the present disclosure, desirably, in the indicator apparatus for the vehicle, the drawing operation on the road surface is not performed even when the travel course changing operation is performed, when the hazard switch is set in the ON state during a period in which the vehicle is stopped.

According to another aspect of the present disclosure, desirably, in the indicator apparatus for the vehicle, the travel course changing operation is a switching-ON operation of a turn signal switch, and the prohibition of the drawing operation on the road surface is terminated when the turn signal switch is set in an ON state while the vehicle is traveling or is starting to travel.

According to another aspect of the present disclosure, desirably, in the indicator apparatus for the vehicle, the travel course changing operation is a steering operation, and the prohibition of the drawing operation on the road surface is terminated when the vehicle is being steered while the vehicle is traveling or is starting to travel.

According to the indicator apparatus for the vehicle of an aspect of the present disclosure, the indication is not drawn on the road surface in a linked manner with the turn signal lamp, and confusion of pedestrians or the like in the surroundings can be prevented.

BRIEF DESCRIPTION OF DRAWINGS

Embodiment(s) of the present disclosure will be described based on the following figures, wherein:

FIG. 3 is a flowchart showing a flow of an indication by the indicator apparatus for a vehicle according to the embodiment of the present disclosure;

FIG. 4 is a flowchart showing a flow of an indication during travel by the indicator apparatus for a vehicle according to another embodiment of the present disclosure;

FIG. 5 is a flowchart showing a flow of an indication during stopping of the vehicle by the indicator apparatus for a vehicle according to the other embodiment of the present disclosure;

DESCRIPTION OF EMBODIMENTS

Figure 1:
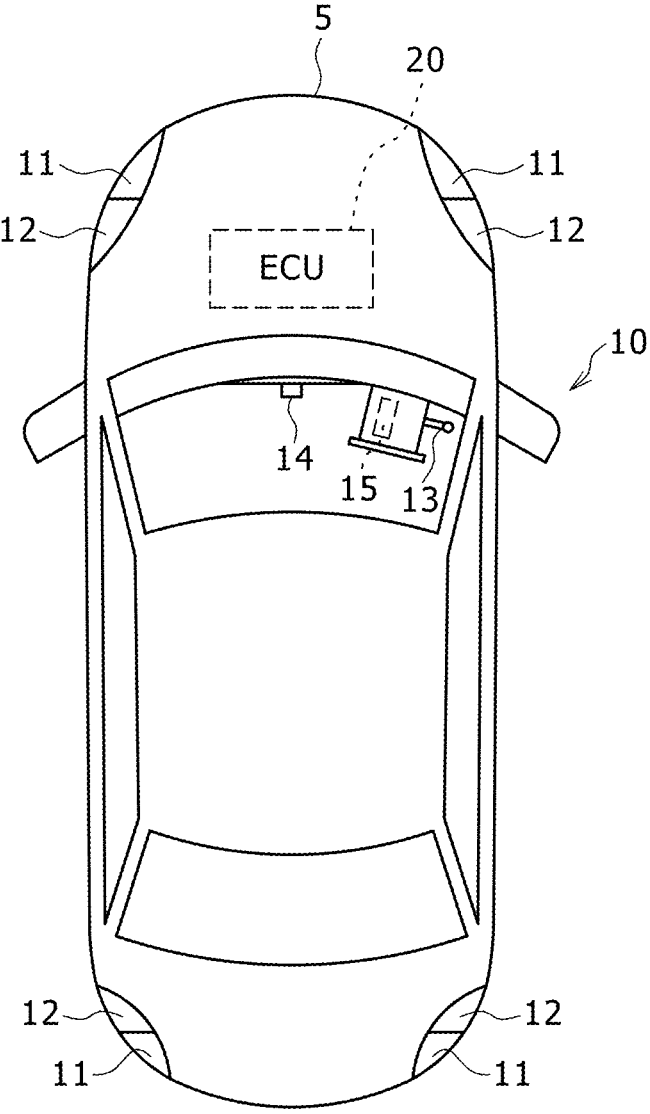
FIG. 1 is a schematic diagram showing a vehicle having an indicator apparatus for a vehicle according to an embodiment of the present disclosure.

An embodiment of the present disclosure will now be described in detail. In the following description, a specific shape, a specific material, a specific direction, a specific numerical value, and the like are merely exemplary for facilitating understanding of the present disclosure, and the specifics may be suitably changed according to usage, objective, specification, or the like.

[Vehicle]

A vehicle 5 having an indicator apparatus 10 according to an embodiment of the present disclosure will now be described with reference to FIG. 1.

The vehicle 5 has the indicator apparatus 10, details of which will be described below. The vehicle 5 is an engine-driven vehicle having four wheels, but is not limited to such a vehicle. For example, the vehicle 5 may be an electricity-driven vehicle or a hybrid electric vehicle.

[Indicator Apparatus]

The indicator apparatus 10 according to the embodiment of the present disclosure will now be described with reference to FIGS. 1 to 3.

The indicator apparatus 10 serving as an indicator apparatus for a vehicle draws an indication of a predetermined shape on a road surface on a side of a course of travel by illuminating light onto the road surface with a drawing lamp 12 when a user performs a travel course changing operation which is an operation for changing the course of travel of the vehicle 5. Examples of the travel course changing operation include a rotating operation of a turn signal switch 13, and detection of a steering angle of a predetermined angle or more by a steering angle sensor 15.

As will be described in detail later, according to the indicator apparatus 10, a drawing operation on the road surface is not performed in a linked manner with a turn signal lamp 11, and confusion of pedestrians or the like in the surroundings can be prevented.

As shown in FIG. 1, the indicator apparatus 10 has the turn signal lamp 11 provided on each of a left side and a right side of the vehicle 5, and the drawing lamp 12 provided on each of the left side and the right side of the vehicle 5, and which draws an indication of a predetermined shape by illuminating light onto the road surface.

Figure 2:
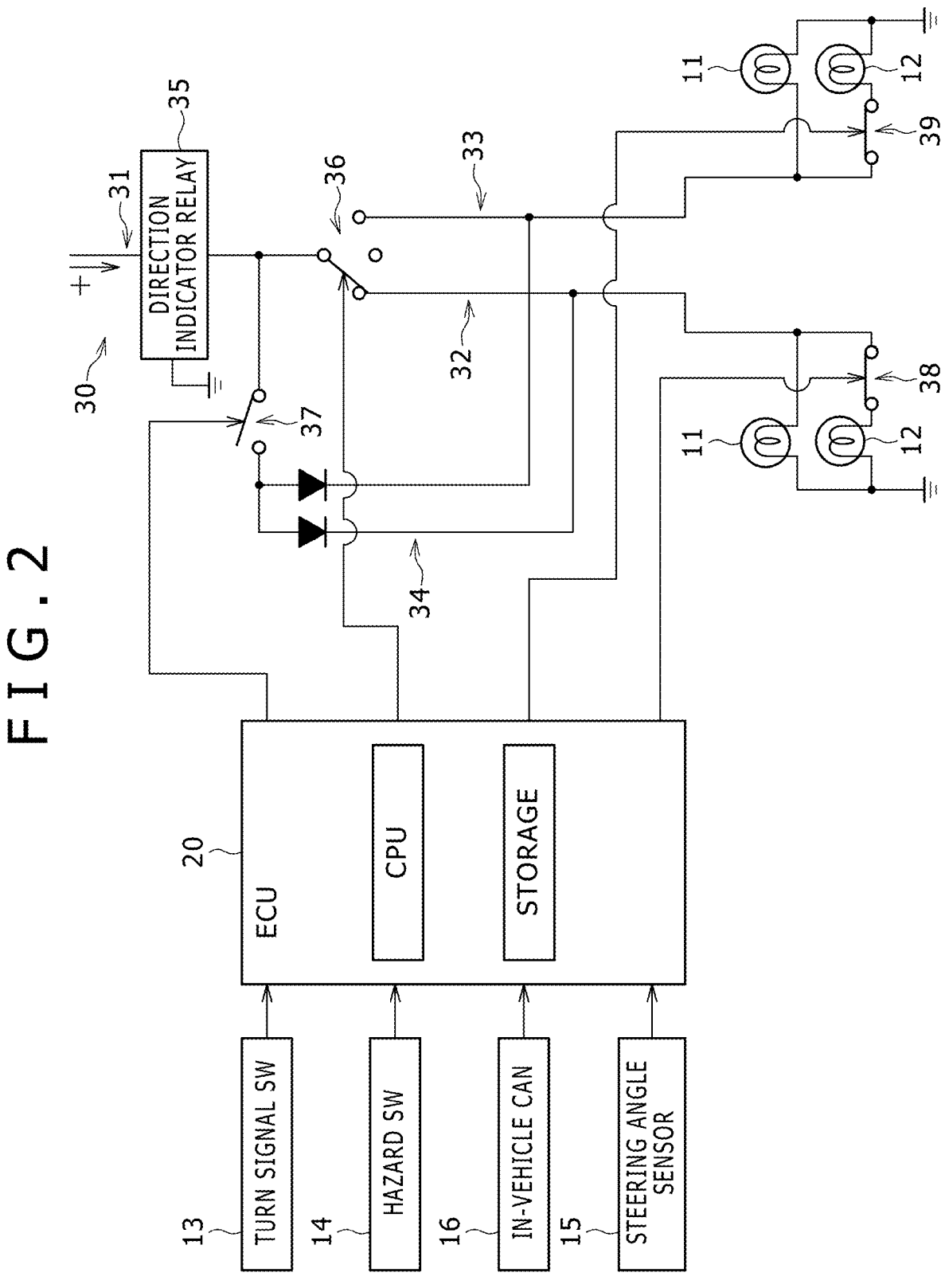
FIG. 2 is a block diagram showing a structure of the indicator apparatus for a vehicle according to the embodiment of the present disclosure.

The indicator apparatus 10 additionally has the turn signal switch 13 for causing the turn signal lamp 11 on the side of the course of travel to blink when the course of travel of the vehicle 5 is changed, a hazard switch 14 for causing the turn signal lamps 11 on both sides of the vehicle 5 to blink, the steering angle sensor 15 for detecting a steering angle of a steering wheel, and an in-vehicle CAN (Controller Area Network) 16 for transmitting a vehicle speed (refer to FIG. 2).

The indicator apparatus 10 further has an ECU (electronic Control Unit) 20 for controlling switching ON and OFF of various switches 36~39 of an indication circuit 30, which will be described below, based on ON/OFF operations of the turn signal switch 13 and/or the hazard switch 14, and the indication circuit 30 including the turn signal lamps 11 and the drawing lamps 12 (refer to FIG. 2).

The turn signal lamp 11 is a signal lamp for indicating change of the course of travel of the vehicle 5 by providing a blinking indication of a direction of travel of the vehicle 5. The turn signal lamp 11 also functions as a hazard lamp by all of the turn signal lamps 11 being caused to simultaneously blink.

As described above, the turn signal lamp 11 is provided on each of the left side and the right side of the vehicle 5. Moreover, the turn signal lamp 11 is provided on each of a front side and a rear side of the vehicle 5. In the present embodiment, a configuration is exemplified in which there are provided a total of four turn signal lamps 11 at the front and rear sides, and the left and right sides of the vehicle 5, but the present disclosure is not limited to such a configuration. For example, the turn signal lamps 11 may be additionally provided on door mirrors on the left and right sides, or on the left and right sides of side portions of the vehicle 5.

As described above, the drawing lamp 12 is provided on each of the left side and the right side of the vehicle 5, and draws the indication of the predetermined shape on the road surface by illuminating light onto the road surface. In the present embodiment, the drawing lamp 12 is provided near respective turn signal lamp 11, and at an outer side of the turn signal lamp 11, but the present disclosure is not limited to such a configuration.

The drawing lamp 12 has, for example, a semiconductor light-emitting element such as an LED, a first lens for projecting light emitted from the semiconductor light-emitting element onto a projection screen, and a second lens for drawing the indication by directing an image of a predetermined shape on the projection screen onto the road surface. On the projection screen, a transparent region corresponding to the predetermined shape to be drawn on the road surface may be formed from the start. Alternatively, there may be employed a configuration similar to that of a transmissive liquid crystal, in which light of various patterns is transmitted by selectively driving a plurality of elements placed in a matrix form.

In the present embodiment, as the predetermined shape drawn by the drawing lamp 12, there will be shown a figure in which a plurality of V shapes having an acute angle portion pointing toward the direction of travel are combined, but the present disclosure is not limited to such a configuration. It is sufficient that a shape indicating the direction of travel is indicated on the road surface.

As described above, the turn signal switch 13 causes the turn signal lamp 11 on the side of the course of travel to blink when the course of travel of the vehicle 5 is changed. The turn signal switch 13 is the so-called direction indicator, and is provided on a left side or a right side of a steering column. The turn signal switch 13 is a rotatable lever. When the turn signal switch 13 is switched to the ON state by being rotated toward the left side, the turn signal lamp 11 on the left side is caused to blink, and, when the turn signal switch 13 is switched to the ON state by being rotated toward the right side, the turn signal lamp 11 on the right side is caused to blink.

As described above, the hazard switch 14 causes all of the turn signal lamps 11 to blink. The hazard switch 14 is a push-button type switch, and is provided between a driver's seat and a passenger seat.

As shown in FIG. 2, the indication circuit 30 has a relay circuit 31 in which a direction indicator relay 35 which is periodically connected to and disconnected from a power supply (not shown) is provided, a left-side indication circuit 32 in which the turn signal lamp 11 on the left side and the drawing lamp 12 on the left side are connected in parallel with each other, a right-side indication circuit 33 in which the turn signal lamp 11 on the right side and the drawing lamp 12 on the right side are connected in parallel with each other, and a both-sides indication circuit 34 connected to the left-side indication circuit 32 and the right-side indication circuit 33.

The switch 36 is provided between the relay circuit 31 and the left-side and right-side indication circuits 32 and 33. The switch 36 can be switched among a left-side ON state in which the relay circuit 31 is connected to the left-side indication circuit 32, a right-side ON state in which the relay circuit 31 is connected to the right-side indication circuit 33, and an OFF state in which the relay circuit 31 is not connected to either one of the left-side and right-side indication circuits 32 and 33.

The switch 36 is driven and controlled in a linked manner with a state of the turn signal switch 13. Specifically, when the turn signal switch 13 is set in the ON state toward the left, the switch 36 is switched to the left-side ON state, and electric power is supplied to the left-side indication circuit 32. Similarly, when the turn signal switch 13 is set in the ON state toward the right, the switch 36 is switched to the right-side ON state, and the electric power is supplied to the right-side indication circuit 33. On the other hand, when the turn signal switch 13 is set in the OFF state, the switch 36 is switched to the OFF state.

The both-sides indication circuit 34 connects the relay circuit 31 and the left-side and right-side indication circuits 32 and 33, bypassing the switch 36. The switch 37 is provided between the both-sides indication circuit 34 and the relay circuit 31. The switch 37 is driven and controlled in a linked manner with a state of the hazard switch 14. Specifically, when the hazard switch 14 is set in the ON state, the switch 37 is switched ON, and the electric power is supplied to both the left-side and right-side indication circuits 32 and 33. On the other hand, when the hazard switch 14 is set in the OFF state, the switch 37 is switched to the OFF state.

As described above, in the left-side indication circuit 32, the turn signal lamp 11 and the drawing lamp 12 are connected in parallel with each other. In addition, on a line on which the drawing lamp 12 is provided, the switch 38 is provided. When the switch 38 is set in the ON state, the drawing lamp 12 and the turn signal lamp 11 are lighted in complete synchronization. The right-side indication circuit 33 is similarly configured, having the switch 39. The switches 38 and 39 are switched OFF when the drawing operation on the road surface is prohibited.

The ECU 20 controls the switch 36 based on a manipulation of the turn signal switch 13, and controls the switch 37 based on a manipulation of the hazard switch 14, so as to control blinking or lighting of the turn signal lamps 11.

In addition to the control of the switches 36 and 37, the ECU 20 controls the switches 38 and 39 based on the turn signal switch 13, the hazard switch 14, the steering angle, and the vehicle speed, so as to control the drawing operation by the drawing lamp 12.

The ECU 20 has a CPU (Central Processing Unit) which is a calculation processor, and storage units such as a RAM (Random Access Memory), a ROM (Read Only Memory), and the like, and performs signal processing according to a program which is stored in the ROM in advance, while utilizing a temporary storage function of the RAM.

As shown in FIG. 2, the ECU 20 is connected to the turn signal switch 13, the hazard switch 14, the steering angle sensor 15, the in-vehicle CAN 16, and the switches 36~39 of the indication circuit 30, receives inputs of ON/OFF manipulation signals of the turn signal switch 13 and the hazard switch 14, and outputs ON/OFF control signals to the switches 36~39 of the indication circuit 30.

Example indications drawn on the road surface according to an embodiment of the present disclosure will now be described. All of the indication patterns by the turn signal lamp 11 and the drawing lamps 12 will be described later with reference to FIGS. 4 and 5.

Figure 6:
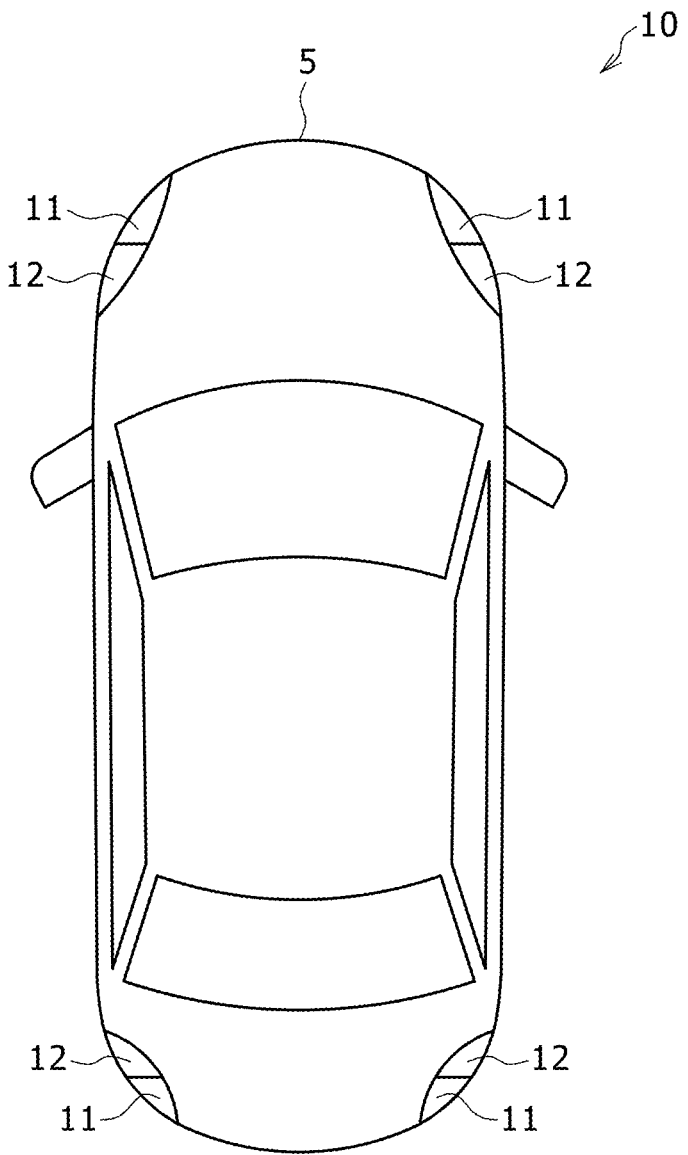
FIG. 6 is a schematic diagram showing an example indication.
Figure 7:
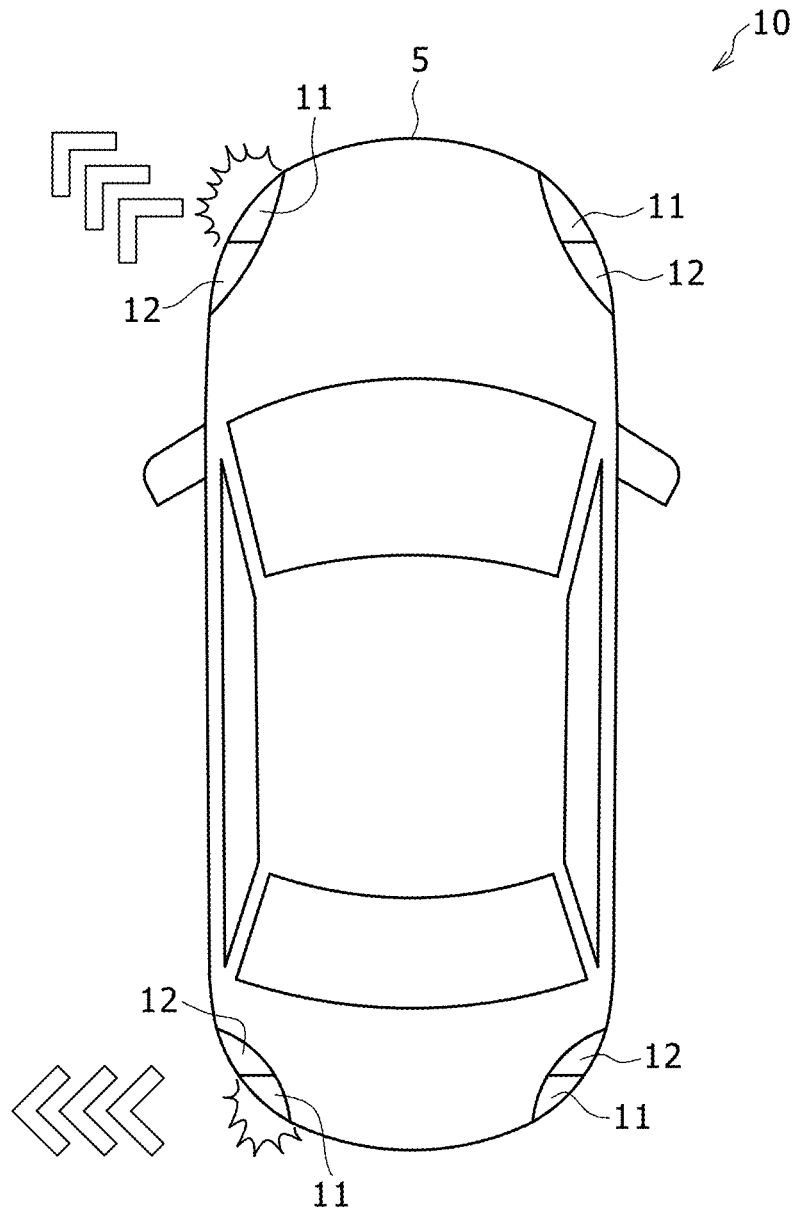
FIG. 7 is a schematic diagram showing another example indication.
Figure 8:
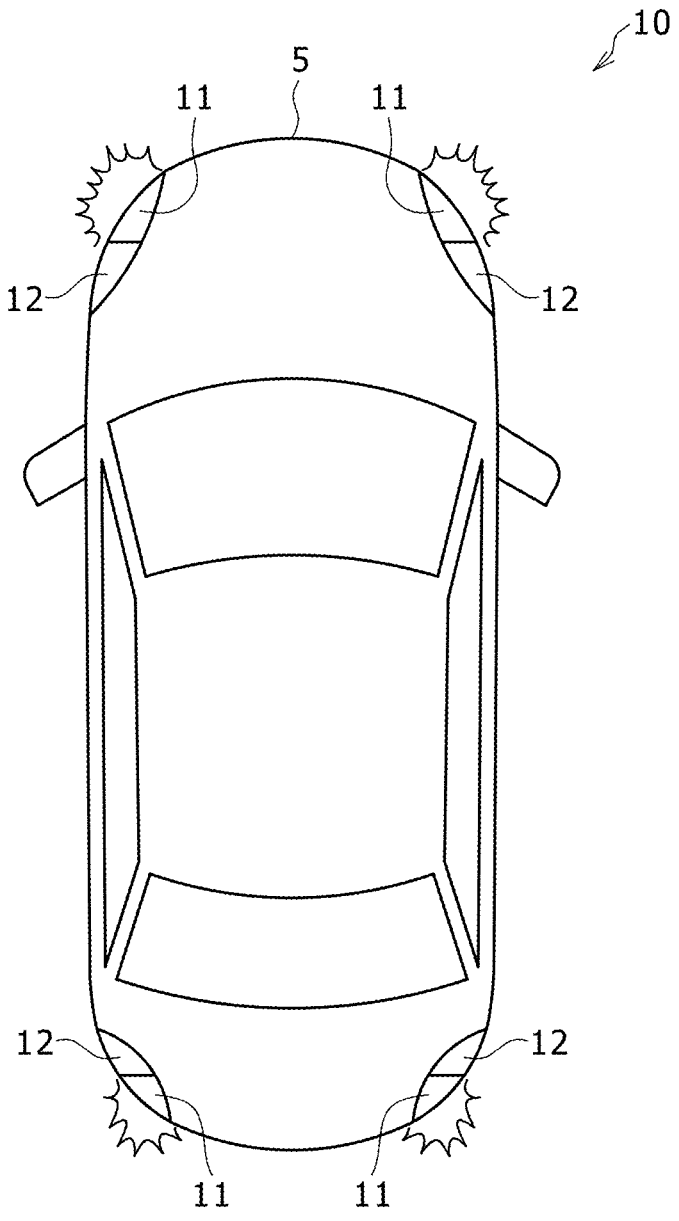
FIG. 8 is a schematic diagram showing another example indication.
Figure 9:
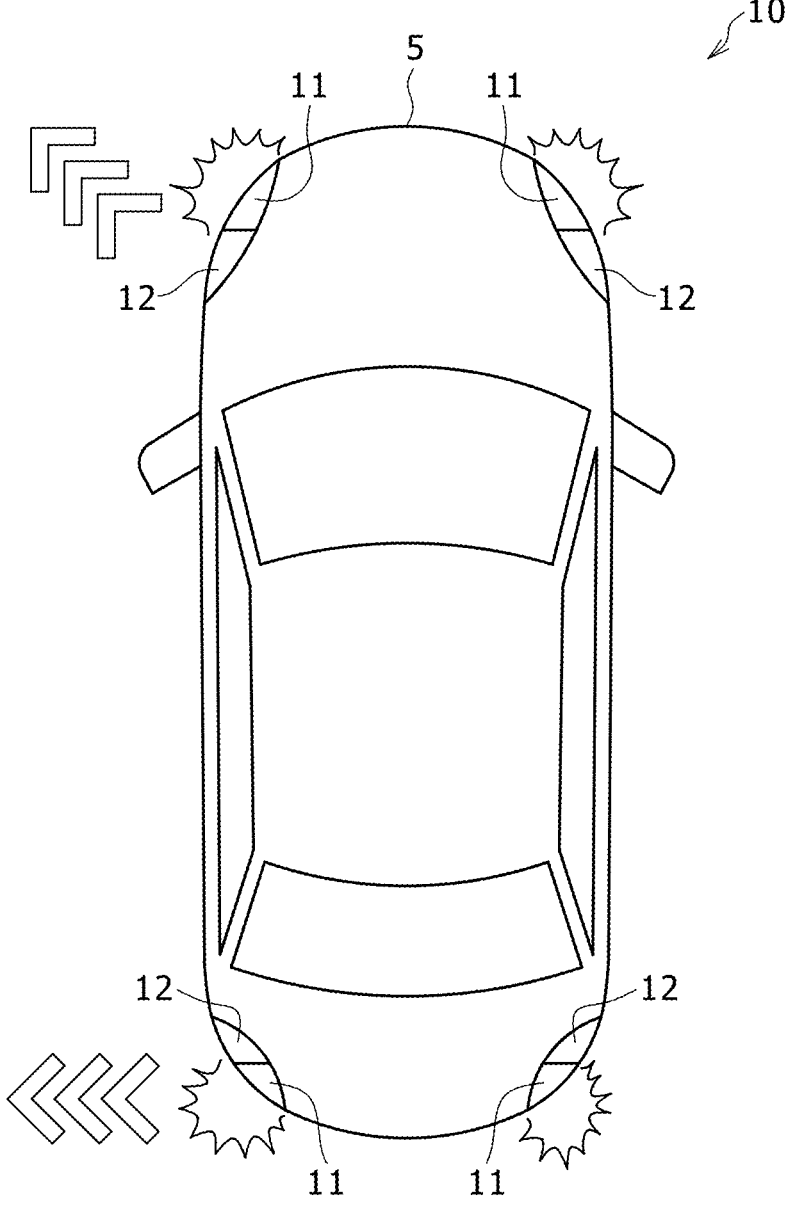
FIG. 9 is a schematic diagram showing another example indication.

For illustration of the example indications, FIGS. 6 to 9 are suitably referred to. FIG. 6 shows a state in which the turn signal lamp 11 is lighted out, and the drawing operation on the road surface is not performed. FIG. 7 shows a state in which the turn signal lamp 11 on the side of the course of travel is caused to blink, and the drawing operation on the road surface is performed on the side of the course of travel. FIG. 8 shows a state in which the turn signal lamps 11 on both sides are caused to blink, and the drawing operation on the road surface is not performed. FIG. 9 shows a state in which the turn signal lamps 11 on both sides are caused to blink, and the drawing operation on the road surface is performed on the side of the course of travel.

The ECU 20 prohibits the drawing operation on the road surface by the drawing lamp 12 when the hazard switch 14 is set in the ON state (for example, an example indication shown in FIG. 8). Specifically, the ECU 20 follows a flow of the indication shown in FIG. 3.

As shown in FIG. 3, in step S11, when the ECU 20 determines that the turn signal switch 13 is set in the ON state, processing proceeds to step S12. On the other hand, when the ECU 20 determines that the turn signal switch 13 is set in the OFF state, processing proceeds to S15.

In step S12, when the ECU 20 determines that the hazard switch 14 is set in the ON state, processing proceeds to step S13, and, when the ECU 20 determines that the hazard switch 14 is set in the OFF state, processing proceeds to step S14.

In step S13, the ECU 20 switches the switch 36 in the indication circuit 30 to the ON state to the side of the course of travel and switches the switch 37 to the ON state, to thereby connect the relay circuit 31 and the both-sides indication circuit 34, and switches the switches 38 and 39 to the OFF state. With this process, the turn signal lamps 11 on both sides are caused to blink while the drawing operation on the road surface by the drawing lamp 12 is not performed (refer to FIG. 8). That is, when the turn signal switch 13 and the hazard switch 14 are both in the ON state, the ECU 20 does not cause the drawing lamp 12 to perform the drawing operation on the road surface.

In step S14, the ECU 20 switches the switch 36 in the indication circuit 30 to the ON state to the side of the course of travel, to thereby connect the relay circuit 31 and the traveling course-side indicator circuit, switches the switch 37 to the OFF state, and switches one of the switches 38 and 39, whichever is on the side of the course of travel, to the ON state. With this process the drawing lamp 12 on the side of the course of travel performs the drawing operation on the road surface, and the turn signal lamp 11 on the side of the course of travel is caused to blink (refer to FIG. 7). That is, when the turn signal switch 13 is set in the ON state but the hazard switch 14 is set in the OFF state, the ECU 20 causes the drawing lamp 12 to perform the drawing operation on the road surface.

In step S15, when the ECU 20 determines that the hazard switch 14 is set in the ON state, processing proceeds to step S16, and when the ECU 20 determines that the hazard switch 14 is set in the OFF state, processing proceeds to step S11.

In step S16, the ECU 20 switches the switch 36 in the indication circuit 30 to the OFF state and switches the switch 37 to the ON state, to thereby connect the relay circuit 31 and the both-sides indication circuit 34, and switches the switches 38 and 39 to the OFF state. With this process, the turn signal lamps 11 on both sides are caused to blink while the drawing operation on the road surface by the drawing lamp 12 is not performed (refer to FIG. 8). That is, when the turn signal switch 13 is set in the ON state and the hazard switch 14 is set in the ON state, the ECU 20 does not cause the drawing lamp 12 to perform the drawing operation on the road surface.

In this manner, when the hazard switch 14 is set in the ON state, the drawing operation on the road surface is always prohibited, and, therefore, the drawing operation on the road surface is not performed in a linked manner with the turn signal lamp 11, and confusion of the pedestrians or the like in the surrounding can be prevented.

Next, another embodiment of the present disclosure will be described. In the example flow of FIG. 3, the drawing operation on the road surface is always prohibited when the hazard switch 14 is set in the ON state. Alternatively, as shown in FIGS. 4 and 5, the prohibition of the drawing operation on the road surface may be terminated under certain conditions. In the example flows of FIGS. 4 and 5, the drawing operation on the road surface is performed even when the hazard switch 14 is set in the ON state when the turn signal switch 13 is set in the ON state or when a steering operation is performed while the vehicle 5 is traveling or is starting to travel.

On the other hand, when the vehicle 5 is stopped, and the hazard switch 14 is set in the ON state, the drawing operation on the road surface is prohibited. Therefore, the ECU 20 does not cause the drawing lamp 12 to perform the drawing operation on the road surface even when the turn signal switch 13 is set in the ON state when the hazard switch 14 is set in the ON state while the vehicle 5 is stopped (when a vehicle speed transmitted by the in-vehicle CAN is less than a predetermined speed).

More specifically, in the indication circuit 30, the switch 36 is switched to the ON state to the side of the course of travel so that the relay circuit 31 and the traveling course-side indication circuit are connected to each other, the switch 37 is switched to the ON state, and the switches 38 and 39 are set to the OFF state. With this process, the turn signal lamps 11 on both sides are caused to blink while the drawing operation on the road surface by the drawing lamp 12 is not performed (refer to FIG. 8; an operation similar to step S33 to be described below).

Further, as described above, the ECU 20 terminates the prohibition of the drawing operation on the road surface by the drawing lamp 12 even when the hazard switch 14 is set in the ON state, when the turn signal switch 13 is set in the ON state while the vehicle 5 is traveling or is starting to travel (when the vehicle speed transmitted by the in-vehicle CAN 16 is greater than or equal to the predetermined speed).

More specifically, in the indication circuit 30, the switch 36 is switched to the ON state to the side of the course of travel, and the switch 37 is switched to the ON state, so that the relay circuit 31 and the both-sides indication circuit 34 are connected to each other, and one switch, among the switches 38 and 39, on the side of the course of travel is switched to the ON state so that the drawing lamp 12 on the side of the course of travel is connected. With this process, the drawing lamp 12 on the side of the course of travel performs the drawing operation on the road surface, and the turn signal lamps 11 on both sides are caused to blink (refer to FIG. 9; an operation similar to step S24 to be described below).

In the present embodiment, a configuration is employed in which it is detected whether or not the vehicle 5 is traveling or starting to travel based on the vehicle speed transmitted by the in-vehicle CAN 16, but the present disclosure is not limited to such a configuration. For example, it may be possible to detect that the vehicle 5 is traveling or is starting to travel by a position of the shift lever being in a D range.

In addition, the ECU 20 terminates the prohibition of the drawing operation on the road surface by the drawing lamp 12 even when the hazard switch 14 is set in the ON state, when a steering angle detected by the steering angle sensor 15 is greater than or equal to a predetermined angle while the vehicle 5 is traveling or is starting to travel.

More specifically, in the indication circuit 30, the switch 36 is set to the OFF state, and the switch 37 is set to the ON state so that the relay circuit 31 and the both-sides indication circuit 34 are connected to each other, and one switch, among the switches 38 and 39, on the side of the course of travel is set to the ON state so that the drawing lamp 12 on the side of the course of travel is connected. With this process, the drawing lamp 12 on the side of the course of travel performs the drawing operation on the road surface, and the turn signal lamps 11 on both sides are caused to blink (refer to FIG. 9; an operation similar to step S28 to be described below).

In this manner, even when the hazard switch 14 is set in the ON state, when the user performs the travel course changing operation while the vehicle 5 is traveling or is starting to travel, the prohibition of the drawing operation is terminated, and an intention of the travel course changing operation of the vehicle 5 can be communicated to other vehicles or the like in the surroundings.

EXAMPLE INDICATION

With reference to FIGS. 4 and 5, flows of indication by the ECU 20 will now be described.

As shown in FIG. 4, in step S21, when the vehicle speed transmitted by the in-vehicle CAN 16 is greater than or equal to a predetermined vehicle speed, the ECU 20 determines that the vehicle 5 is traveling or is starting to travel, and processing proceeds to S22. When the vehicle speed is less than the predetermined speed, the ECU 20 determines that the vehicle 5 is stopped, and processing proceeds to step S31 (refer to FIG. 5).

[Traveling or Starting to Travel]

In step S22, when the ECU 20 determines that the turn signal switch 13 is set in the ON state, processing proceeds to step S23, and when the ECU 20 determines that the turn signal switch 13 is set in the OFF state, processing proceeds to step S26.

In step S23, when the ECU 20 determines that the hazard switch 14 is set in the ON state, processing proceeds to step S24, and when the ECU 20 determines that the hazard switch 14 is set in the OFF state, processing proceeds to step S25.

In step S24, the ECU 20 switches the switch 36 in the indication circuit 30 to the ON state to the side of the course of travel, and switches the switch 37 to the ON state, to thereby connect the relay circuit 31 and the both-sides indication circuit 34 to each other, and switches one switch, among the switches 38 and 39, on the side of the course of travel to the ON state, so that the drawing lamp 12 on the side of the course of travel is connected. With this process, the drawing lamp 12 on the side of the course of travel performs the drawing operation on the road surface, and the turn signal lamps 11 on both sides are caused to blink (refer to FIG. 9).

In step S25, the ECU 20 switches the switch 36 in the indication circuit 30 to the ON state to the side of the course of travel, to connect the relay circuit 31 and the traveling course-side indication circuit to each other, switches the switch 37 to the OFF state, and switches one switch, among the switches 38 and 39, on the side of the course of travel to the ON state, so that the drawing lamp 12 on the side of the course of travel is connected. With this process, the drawing lamp 12 on the side of the course of travel performs the drawing operation on the road surface, and the turn signal lamp 11 on the side of the course of travel is caused to blink (refer to FIG. 7).

In step S26, when the ECU 20 determines that the hazard switch 14 is set in the ON state, processing proceeds to step S27, and when the ECU 20 determines that the hazard switch 14 is set in the OFF state, processing proceeds to step S21.

In step S27, when the steering angle detected by the steering angle sensor 15 is greater than or equal to a predetermined angle, the ECU 20 determines that the vehicle 5 is being steered, and processing proceeds to step S28. When the steering angle is less than the predetermined angle, the ECU 20 determines that the vehicle 5 is not being steered, and processing proceeds to step S29.

In step S28, the ECU 20 switches the switch 36 in the indication circuit 30 to the OFF state and switches the switch 37 to the ON state, to thereby connect the relay circuit 31 and the both-sides indication circuit 34 to each other, and switches one switch, among the switches 38 and 39, on the side of the course of travel to the ON state, so that the drawing lamp 12 on the side of the course of travel is connected. With this process, the drawing lamp 12 on the side of the course of travel performs the drawing operation on the road surface, and the turn signal lamps 11 on both sides are caused to blink (refer to FIG. 9).

In step S29, the ECU 20 switches the switch 36 in the indication circuit 30 to the OFF state and switches the switch 37 to the ON state, to thereby connect the relay circuit 31 and the both-sides indication circuit 34 to each other, and switches the switches 38 and 39 to the OFF state. With this process, the turn signal lamps 11 on both sides are caused to blink while the drawing operation on the road surface is not performed by the drawing lamp 12 (refer to FIG. 8).

When the determination in step S26 is NO, the ECU 20 switches the switch 36 in the indication circuit 30 to the OFF state and switches the switch 37 to the OFF state, to disconnect the relay circuit 31 and the both-sides indication circuit 34 from each other, and switches the switches 38 and 39 to the OFF state. With this process, the drawing operation on the road surface is not performed and the turn signal lamp 11 is not lighted (refer to FIG. 6).

[Stopped State]

As shown in FIG. 5, in step S31, when the ECU 20 determines that the turn signal switch 13 is set in the ON state, processing proceeds to step S32, and when the ECU 20 determines that the turn signal switch 13 is set in the OFF state, processing proceeds to step S35.

In step S32, when the ECU 20 determines that the hazard switch 14 is set in the ON state, processing proceeds to step S33, and when the ECU 20 determines that the hazard switch 14 is set in the OFF state, processing proceeds to step S34.

In step S33, the ECU 20 switches the switch 36 in the indication circuit 30 to the ON state to the side of the course of travel, and switches the switch 37 to the ON state, to thereby connect the relay circuit 31 and the both-side indication circuit 34 to each other, and switches the switches 38 and 39 to the OFF state. With this process, the turn signal lamps 11 on both sides are caused to blink while the drawing operation on the road surface is not performed by the drawing lamp 12 (refer to FIG. 8).

In step S34, the ECU 20 switches the switch 36 in the indication circuit 30 to the ON state to the side of the course of travel, to connect the relay circuit 31 and the traveling course-side indication circuit to each other, switches the switch 37 to the OFF state, and switches one switch, among the switches 38 and 39, on the side of the course of travel to the ON state. With this process, the drawing lamp 12 on the side of the course of travel performs the drawing operation on the road surface, and the turn signal lamp 11 on the side of the course of travel is caused to blink (refer to FIG. 7).

In step S35, when the ECU 20 determines that the hazard switch 14 is set in the ON state, processing proceeds to step S36, and when the ECU 20 determines that the hazard switch 14 is set in the OFF state, processing proceeds to step S21.

In step S36, the ECU 20 switches the switch 36 in the indication circuit 30 to the OFF state, and switches the switch 37 to the ON state, to thereby connect the relay circuit 31 and the both-sides indication circuit 34 to each other, and switches the switches 38 and 39 to the OFF state. With this process, the turn signal lamps 11 on both sides are caused to blink while the drawing operation on the road surface is not performed by the drawing lamp 12 (refer to FIG. 8).

When the determination in step S35 is NO, the ECU 20 switches the switch 36 in the indication circuit 30 to the OFF state and switches the switch 37 to the OFF state, to disconnect the relay circuit 31 and the both-sides indication circuit 34 from each other, and switches the switches 38 and 39 to the OFF state. With this process, the drawing operation on the road surface is not performed, and the turn signal lamp 11 is not lighted (refer to FIG. 6).

The present disclosure is not limited to the embodiment described above, and alternative configurations thereof, and various modifications and improvements are possible within the scope and spirit of the present disclosure as defined in the claims.

The invention claimed is:

1. An indicator apparatus for a vehicle, wherein
   the indicator apparatus draws, while blinking, an indication of a predetermined shape on a road surface on a side to which a course of travel is changed by illuminating light onto the road surface when a user performs a travel course changing operation which is an operation for changing the course of travel of a vehicle towards the right or the left, and
   a drawing operation on the road surface is not performed when a hazard switch is set in an ON state.

* * * * *